United States Patent
Dai et al.

(10) Patent No.: US 9,534,745 B2
(45) Date of Patent: Jan. 3, 2017

(54) LENS AND LED UNIT USING THE SAME

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 237 days.

(21) Appl. No.: 14/085,689

(22) Filed: Nov. 20, 2013

(65) Prior Publication Data

US 2015/0117023 A1    Apr. 30, 2015

(30) Foreign Application Priority Data

Oct. 25, 2013   (TW) .............................. 102138785 A

(51) Int. Cl.

| | |
|---|---|
| *F21V 5/00* | (2015.01) |
| *F21K 99/00* | (2016.01) |
| *F21V 13/04* | (2006.01) |
| *G02B 3/00* | (2006.01) |
| *F21Y 101/02* | (2006.01) |

(52) U.S. Cl.
CPC ................. *F21K 9/54* (2013.01); *F21V 13/04* (2013.01); *G02B 3/00* (2013.01); *F21Y 2101/02* (2013.01)

(58) Field of Classification Search
CPC .......... F21K 9/54; F21V 13/04; F21Y 2101/02
USPC ............................ 362/311.01, 311.02, 311.06
See application file for complete search history.

(56) References Cited

U.S. PATENT DOCUMENTS

2011/0110097 A1*  5/2011  Fu et al. ................... 362/296.01
2013/0155690 A1*  6/2013  Chen et al. ............... 362/311.02

* cited by examiner

*Primary Examiner* — Andrew Coughlin
*Assistant Examiner* — Meghan Ulanday
(74) *Attorney, Agent, or Firm* — Zhigang Ma

(57) ABSTRACT

A lens includes a bottom face, a light incident face defined in the bottom face, a plurality of light reflective faces connecting the light incident face with the bottom face, and a light emerging face opposite to the light incident face. The light incident face includes a first face and a plurality of second faces alternating with the light reflective faces. The light reflective faces are flat faces parallel to an optical axis of the lens. An LED unit using the lens is also disclosed.

17 Claims, 5 Drawing Sheets

LENS AND LED UNIT USING THE SAME

BACKGROUND

1. Technical Field

The disclosure generally relates to lenses and LED (light emitting diode) units using the lenses, and more particularly, to a lens having a plurality of light reflective faces and an LED unit using the lens.

2. Description of Related Art

Nowadays LEDs (light emitting diodes) are applied widely in various applications for illumination. The LED is a highly pointed light source. Thus, the LED is generally used with a lens to modulate the light distribution thereof. However, the typical lens cannot effectively converge the light emitted from the lens, resulting in significant intensity difference between the light at the optical axis and the light adjacent to the optical axis. Thus, the light intensity at a central area of the light distribution is not uniform enough.

What is needed, therefore, is a lens and an LED unit using the lens which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
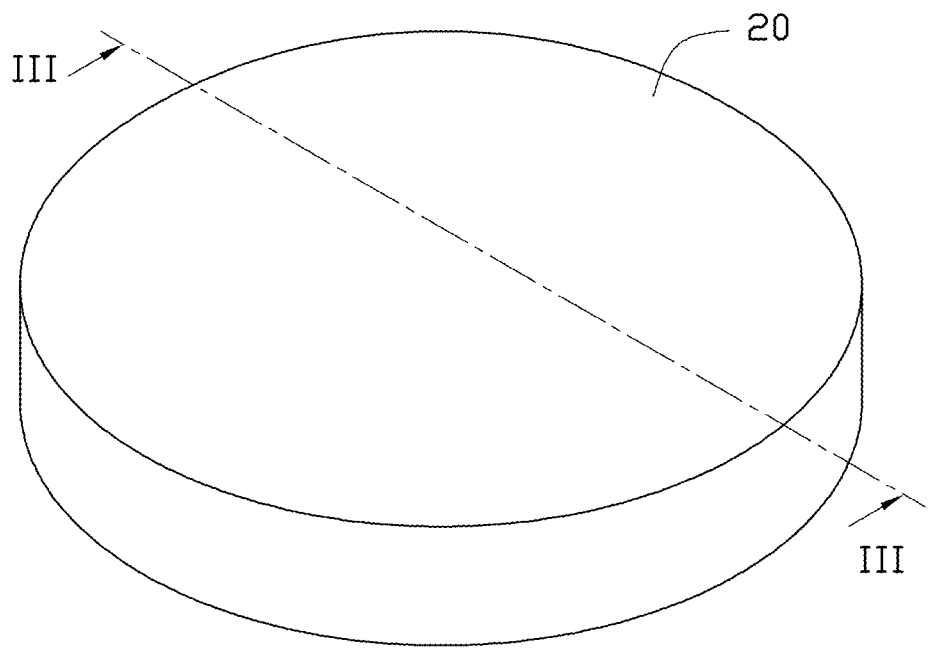
FIG. 1 is an isometric view of an LED unit in accordance with an embodiment of the present disclosure.
Figure 4:
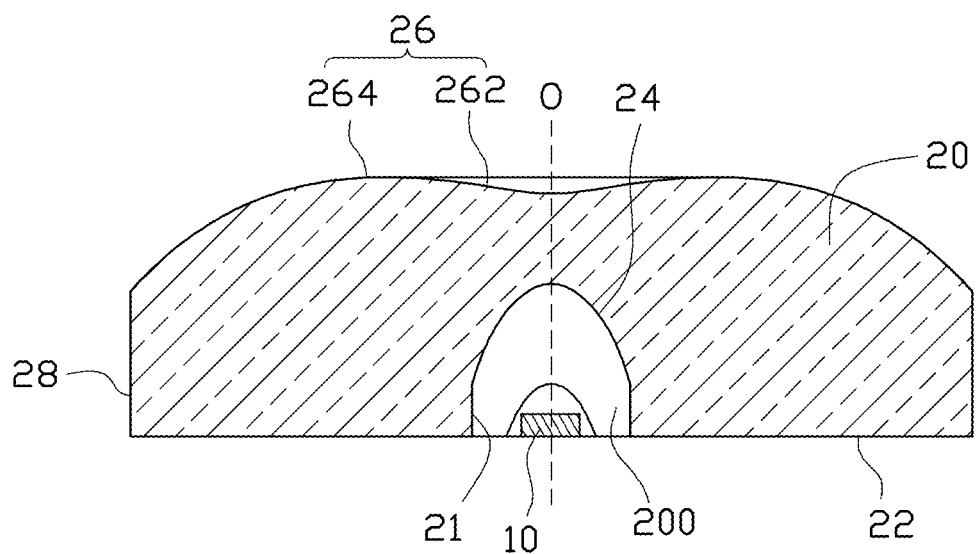
FIG. 4 is similar to FIG. 3, wherein the LED is placed within the lens.

Referring to FIGS. 1 and 4, an LED (light emitting diode) unit in accordance with an embodiment of the present disclosure is shown. The LED unit includes an LED 10 and a lens 20 covering the LED 10.

The lens 20 may be made of transparent material such as epoxy, silicone, glass or the like. The lens 20 includes a bottom face 22, a light incident face 24 formed in the bottom face 22, four light reflective faces 21 connecting the light incident face 24, a light emerging face 26 opposite to the bottom face 22 and a lateral face 28 connecting the bottom face 22 and the light emerging face 26. The lens 20 has an optical axis O extending through a center of the light incident face 24 and the light emerging face 26.

Figure 2:
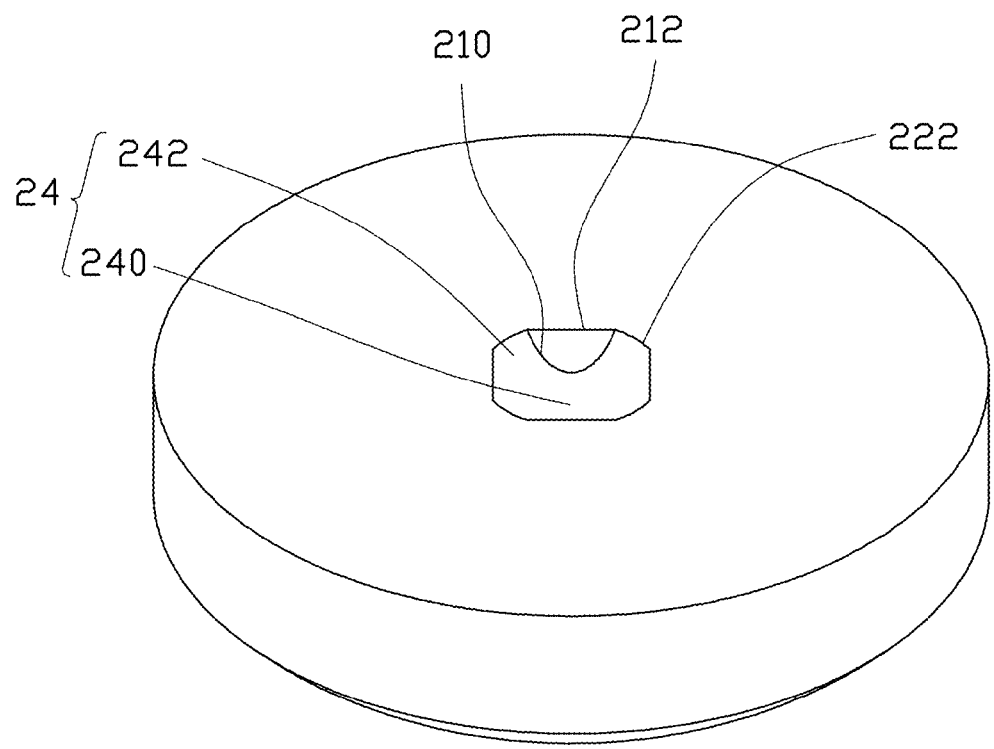
FIG. 2 is an inverted view of the LED unit of FIG. 1, wherein an LED of the LED unit is removed for clarity.
Figure 3:
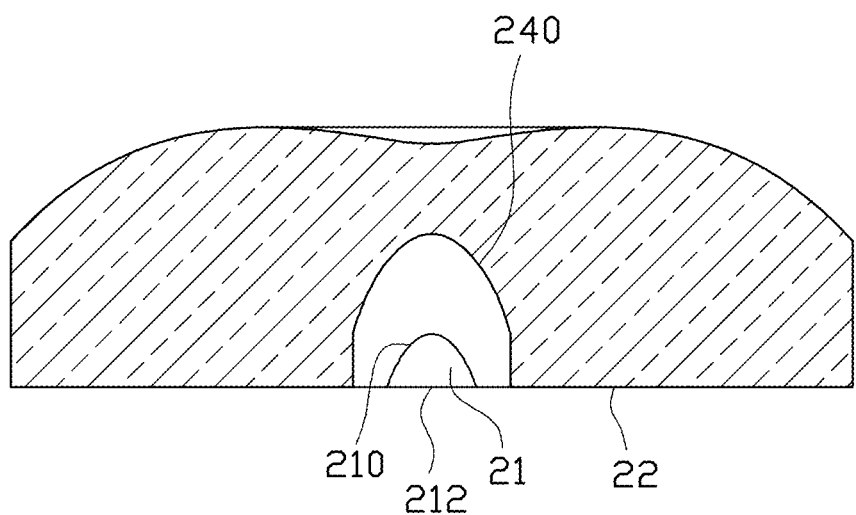
FIG. 3 is a cross section of the lens of the LED unit of FIG. 1, taken along line III-III thereof.

Also referring to FIGS. 2-3, the bottom face 22 is a flat and circular face. The light incident face 24 and the four light reflective faces 21 are all defined in a central area of the bottom face 22. A cavity 200 is enclosed by the light incident face 24 and the four light reflective faces 21 to receive the LED 10. The cavity 200 has a diameter gradually decreasing from the bottom face 22 towards the light emerging face 26. The light incident face 24 includes a first face 240 and four second faces 242 connecting the first face 240. The first face 240 is an elliptical face with a long axis perpendicular to the bottom face 22, and a short axis parallel to the bottom face 22. The first face 240 is located above the four second faces 242. The four second faces 242 alternate with the four light reflective faces 21. Each second face 242 is located between every two adjacent light reflective faces 21. Each second face 242 connects the first face 240 with the bottom face 22. Each second face 242 is a curved face having a width gradually increasing from the bottom face 22 towards the first face 240. Each second face 242 is a part of an elliptical face continuous from the elliptical face of the first face 240. Each second face 242 has a curved bottom edge 222 connecting the bottom face 22.

The four light reflective faces 21 are uniformly distributed in the cavity 200. Each light reflective face 21 is flat and perpendicular to the bottom face 22. Each light reflective face 21 has a bottom edge 212 connecting the bottom face 22 and a top edge 210 connecting the light incident face 24. The bottom edge 212 is straight, and the top edge 210 is elliptical. The bottom edge 212 of each light reflective face 21 connects the bottom edges 222 of two adjacent second faces 242. Each light reflective face 21 has an area larger than that of each second face 242.

Figure 5:
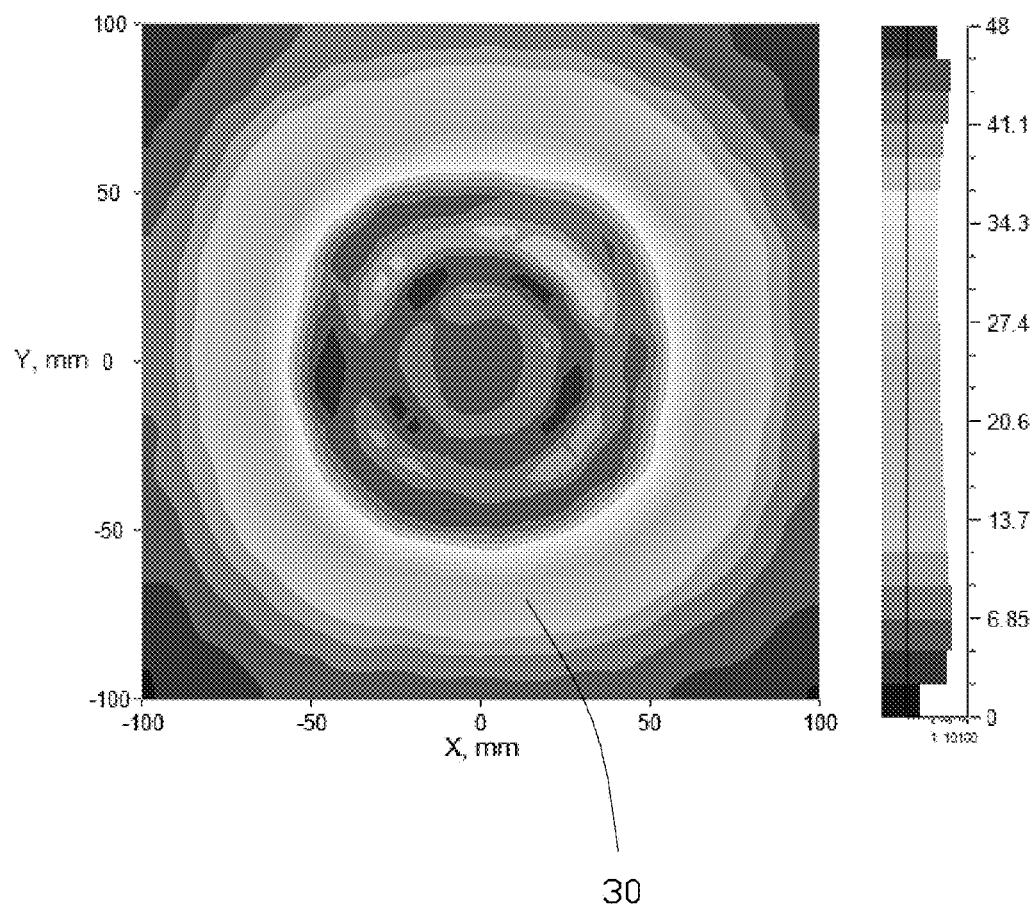
FIG. 5 shows a light distribution of the LED unit of FIG. 1.

Also referring to FIG. 5, the LED 10 is received in the cavity 200. The LED 10 may be made of semiconductor material such as GaN, InGaN, AlInGaN or the like. The LED 10 can emit visible light when being powered. In this embodiment, the LED 10 is a white LED 40. The LED 10 has a height less than that of each light reflective face 21. A part of the light emitted from the LED 10 having a small angle deviated from the optical axis O of the lens 20, directly passes through the first face 240 of the light incident face 24 into the lens 20. Another part of the light emitted from the LED 10 having a large angle deviated from the optical axis O of the lens 20, is reflected by the light reflective faces 21 to enter the lens 20 through the first face 240. Remaining part of the light emitted from the LED 10 having a large angle deviated from the optical axis O of the lens 20, directly passes through the second faces 242 of the light incident face 24 into the lens 20. The another part of the light is reflected by the light reflective faces 21 to transmit more approximately to the optical axis O (i.e., the light after being reflected, has an angle deviated from the optical axis O smaller than that of the light before being reflected). Thus, more light can be converged to transmit along or approximate to the optical axis O, thereby reducing intensity difference between the light at the optical axis O and the light approximate to the optical axis O. Accordingly, a light distribution 30 of the LED unit has a uniform intensity in a central area thereof.

The light emerging face 26 is located above the bottom face 22. The light emerging face 26 includes a concave face 262 and a convex face 264 surrounding the concave face 262. The concave face 262 is located at a central area of the light emerging face 26 and opposite to the light incident face 24. The concave face 262 has a curvature less than that of the light incident face 24. The convex face 264 connects the concave face 262 with the lateral face 28. In this embodiment, a junction between the concave face 262 and the convex face 264 is smooth and curved, and a junction between the lateral face 28 and the convex face 264 is abrupt. The convex face 264 has a bottom lower than a top of the light incident face 24. The light emerging face 26 can diverge the light from the light incident face 24 out of the lens 20, thereby illuminating a large area.

The lateral face 28 directly connects the convex face 264 with the bottom face 22. The lateral face 28 is a cylindrical face perpendicular to the bottom face 22. The lateral face 28 may be further coated with a reflective layer for reflecting the light from the light incident face 24 towards the light emerging face 26.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A lens comprising:
   a bottom face;
   a light incident face defined in the bottom face;
   a plurality of light reflective faces connecting and adjoining the light incident face adjacent to the bottom face; and
   a light emerging face opposite to the bottom face;
   wherein each light reflective face is totally enclosed by a top edge and a bottom edge connecting the top edge, the top edge directly connecting and adjoining the light incident face, and the bottom edge directly connecting the bottom face.

2. The lens of claim 1, wherein the lens comprises an optical axis extending through a center of the light incident face and a center of the light emerging face, the light reflective faces being parallel to the optical axis.

3. The lens of claim 1, wherein each light reflective face is a flat face.

4. The lens of claim 1, wherein the light reflective faces are spaced from each other.

5. The lens of claim 1, wherein the top edge is curved, and the bottom edge is straight.

6. The lens of claim 1, wherein the top edge is elliptical.

7. The lens of claim 1, wherein the light incident face comprises a first face and a plurality of second faces connecting the first face, the second faces alternating with the light reflective faces.

8. The lens of claim 7, wherein the first face comprises an elliptical face.

9. The lens of claim 7, wherein each second face has a width gradually increasing from the bottom face towards the first face.

10. The lens of claim 7, wherein each second face directly connects the first face, two adjacent light reflective faces and the bottom face.

11. The lens of claim 7, wherein a boundary between each second face and the bottom face is curved.

12. An LED (light emitting diode) unit comprising:
    an LED;
    a lens covering the LED, the lens comprising:
       a bottom face;
       a light incident face defined in the bottom face, the LED facing the light incident face;
       a plurality of light reflective faces surrounding the LED, each light reflective face connecting and adjoining the light incident face with the bottom face; and
       a light emerging face opposite to the bottom face;
    wherein each light reflective face is totally enclosed by a top edge and a bottom edge connecting the top edge, the top edge directly connecting and adjoining the light incident face, and the bottom edge directly connecting the bottom face.

13. The LED unit of claim 12, wherein the light reflective faces are spaced from each other without direct contact.

14. The LED unit of claim 12, wherein the light incident face comprises a first face and a plurality of second faces connecting the first face with the bottom face, the second faces alternating with the light reflective faces.

15. The LED unit of claim 14, wherein a boundary between each second face and the bottom face is curved.

16. The LED unit of claim 12, wherein the top edge is curved and the bottom edge is straight.

17. The LED unit of claim 12, wherein the LED has a height less than that of each light reflective face.

* * * * *